(12) United States Patent
Virani et al.

(10) Patent No.: US 10,921,755 B2
(45) Date of Patent: Feb. 16, 2021

(54) METHOD AND SYSTEM FOR COMPETENCE MONITORING AND CONTIGUOUS LEARNING FOR CONTROL

(71) Applicant: General Electric Company, Schenectady, NY (US)

(72) Inventors: Nurali Virani, Niskayuna, NY (US); Abhishek Srivastav, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 91 days.

(21) Appl. No.: 16/222,279

(22) Filed: Dec. 17, 2018

(65) Prior Publication Data
US 2020/0192306 A1  Jun. 18, 2020

(51) Int. Cl.
*G05B 13/02* (2006.01)

(52) U.S. Cl.
CPC ................. *G05B 13/0275* (2013.01)

(58) Field of Classification Search
USPC .......................................................... 700/47
See application file for complete search history.

(56) References Cited

U.S. PATENT DOCUMENTS

| 6,446,056 B1 | 9/2002 | Sadakuni |
| 6,587,846 B1 | 7/2003 | LaMuth |
| 9,645,575 B2 | 5/2017 | Watson |
| 2003/0101151 A1 | 5/2003 | Holland |
| 2006/0247798 A1* | 11/2006 | Subbu ................. G06N 3/126 700/44 |
| 2010/0138368 A1* | 6/2010 | Stundner ............. G06N 20/00 706/12 |

(Continued)

FOREIGN PATENT DOCUMENTS

| CN | 204416544 U | 6/2015 |
| CN | 107545072 A | 1/2018 |

(Continued)

OTHER PUBLICATIONS

Artificial Intelligence (AI) "I'm sorry, I don't know how to help with that . . . Yet." https://www.intuition.com/artificial-intelligence-im-sorry-i-dont-know-how-to-help-with-that-yet/, retrieved on Jan. 3, 2019, 3pgs.

(Continued)

*Primary Examiner* — Md Azad
(74) *Attorney, Agent, or Firm* — Buckley, Maschoff & Talwalkar LLC (57) ABSTRACT

According to some embodiments a competence module is provided to: receive an objective; select a machine learning model associated with the objective; receive data from the at least one data source; determine at least one next input based on the received data; determine whether the at least one next input is in a competent region or is in an incompetent region of the machine learning model; when the at least one next input is inside the competent region, generate an output; determine an estimate of uncertainty for the generated output; when the uncertainty is below an uncertainty threshold, the machine learning model is competent and when the uncertainty is above the uncertainty threshold, the machine learning model is incompetent; and operate the physical asset based on one of the competent and incompetent state of the machine learning model. Numerous other aspects are provided.

20 Claims, 6 Drawing Sheets

(56) References Cited

U.S. PATENT DOCUMENTS

| | | |
|---|---|---|
| 2014/0046891 A1 | 2/2014 | Banas |
| 2014/0188768 A1* | 7/2014 | Bonissone ............. G06N 20/00 706/12 |
| 2015/0148919 A1* | 5/2015 | Watson .................. G06N 7/005 700/31 |
| 2017/0024649 A1 | 1/2017 | Yan et al. |
| 2017/0109655 A1 | 4/2017 | Miyazaki |
| 2017/0244608 A1 | 8/2017 | Reaux-Savonte |
| 2017/0372191 A1 | 12/2017 | Reaux-Savonte |
| 2018/0341876 A1 | 11/2018 | Ghosh et al. |

FOREIGN PATENT DOCUMENTS

| | | |
|---|---|---|
| JP | H10207504 A | 8/1998 |
| JP | 2015165414 A | 9/2015 |
| JP | 2016026356 A | 2/2016 |
| WO | 2007067878 A3 | 5/2008 |

OTHER PUBLICATIONS

"Will artificial intelligence ever have emotions or feelings?", BitBrain, https://www.bitbrain.com/blog/artificial-intelligence-emotions, Oct. 10, 2018, 10pgs.

Tamimi, Hammam et al., "Design and implementation of a soft computing-based controller for a complex mechanical system", Sep. 22, 2016, 148pgs.

Ghaderi, Hojjat "CSC384: Intro to Artificial Intelligence Decision Making Under Uncertainty", University of Toronto, 2006, (pp. 1-70, total 70 pages).

\* cited by examiner

METHOD AND SYSTEM FOR COMPETENCE MONITORING AND CONTIGUOUS LEARNING FOR CONTROL

BACKGROUND

Machine learning (ML) is an application of artificial intelligence that may provide systems the ability to automatically learn (e.g., progressively improve performance on a specific task) from data without being explicitly programmed. Machine learning may be used to control physical assets, where machine learning models may be trained with relevant historical data (training data). However, these ML-based physical asset control systems may be unable to accommodate 1. Input condition never experienced before, and 2. Abrupt changes in data distribution. A conventional approach may be to collect training data based on a fixed schedule (e.g., every six months) and then re-train all machine learning models without leveraging any historical experience. To compensate for possibly out of date data, training data may be collected more frequently or may be collected for a longer period of time. However, both of these compensation techniques are expensive in terms of time and resources.

It would be desirable to provide systems and methods to improve machine learning models and systems.

BRIEF DESCRIPTION

According to some embodiments, a system includes a competence module to receive data from at least one data source; a memory for storing program instructions; a competence processor, coupled to the memory, and in communication with the competence module, and operative to execute program instructions to: receive an objective; select a machine learning model associated with the objective; receive data from the at least one data source; determine at least one next input based on the received data; determine whether the at least one next input is in a competent region or is in an incompetent region of the machine learning model; when the at least one next input is inside the competent region, generate an output of the machine learning model; determine an estimate of uncertainty for the generated output of the machine learning model; when the uncertainty is below an uncertainty threshold, determine the machine learning model is competent and when the uncertainty is above the uncertainty threshold, determine the machine learning model is incompetent; and operate the physical asset based on the state of the machine learning model, where the state is one of competent and incompetent.

According to some embodiments, a method includes receiving an objective; selecting a machine learning model associated with the objective; receiving data from at least one data source; determining at least one next input based on the received data; determining whether the at least one next input is in a competent region or is in an incompetent region of the machine learning model; when the at least one next input is inside the competent region, generating an output of the machine learning model; determining an estimate of uncertainty for the generated output of the machine learning model; when the uncertainty is below an uncertainty threshold, determining the machine learning model is competent and when the uncertainty is above the uncertainty threshold, determining the machine learning model is incompetent; and operating the physical asset based on the state of the machine learning model, where the state is one of competent and incompetent.

According to some embodiments, a non-transitory computer-readable medium storing instructions that, when executed by a computer processor, cause the computer processor to perform a method including receiving an objective; selecting a machine learning model associated with the objective; receiving data from at least one data source; determining at least one next control input based on the received data; determining whether the at least one next control input is in a competent region or an incompetent region of the machine learning model; when the at least one next input is inside the competent region, generating an output of the machine learning model; determining an estimate uncertainty for the generated output of the machine learning model; when the uncertainty is below an uncertainty threshold, determining the machine learning model is competent and when the uncertainty is above the uncertainty threshold, determining the machine learning model is incompetent; and operating the physical asset based on the state of the machine learning model, where the state is one of competent and incompetent.

A technical effect of some embodiments of the invention is an improved and/or computerized technique and system for a machine learning model that may monitor its own competence and improve its own competence via learning. One or more embodiments provide for a competence module that provides for a ML model to be self-aware of its own competence to make predictions (e.g., of its region of trust). One or more embodiments may provide a competence module that may switch to robust behaviors (e.g., base line operating parameters) when incompetence is determined. One or more embodiments provide a competence module that may quantify uncertainty in its own decisions and provide an estimate with a competence value. One or more embodiments may provide a competence module that may create a trigger for continuous learning to update a machine learning model in a region of incompetence, such that the module may improve its competence. One or more embodiments may provide a competence module that dynamically asks/looks for other relevant data sources or sensors, and may ask for help, as the ML model may understand its own limitations per the competence module. One or more embodiments provide for a competence module that may prescribe safe actions for complex systems. One or more embodiments may provide for real-time optimization of an objective with respect to operation of the physical asset. One or more embodiments may provide for competence checking that may be used with an optimizer module as a constraint, so that any scenario being evaluated for optimization in the optimizer module that uses the ML model knows if the evaluation should be trusted or ignored, based on whether the model is competent or not. One or more embodiments provide for improved operation of the physical asset based on the output provided by the competence module. Other real-world benefits include condition-based learning in lieu of predefined suboptimal schedule, incorporating competence constraint in optimization for robust and reliable performance, alerting the user about model incompetence along with exemplar data to enable root-cause analysis in case of abrupt drift or sensor failures, etc.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

Industrial equipment or assets (e.g., physical assets), generally, are engineered to perform particular tasks as part of industrial processes. For example, physical assets may include, among other things and without limitation, manufacturing equipment on a production line, aircraft engines, wind turbines that generate electricity on a wind farm, power plants, locomotives, health care and/or imaging devices (e.g., X-ray or MIR systems) or surgical suites for use in patient care facilities or drilling equipment for use in mining operations. These assets may be controlled by machine-learning systems or frameworks that may be continuously learning from data and applying this learning to control the operation of the asset.

Conventionally, while machine learning (ML) frameworks may address continuous learning and uncertainty quantification (e.g., Bayesian and ensemble models), there may be a gap in guaranteeing accuracy of continuous learning systems without introducing overly conservative assumptions and constraints. Moreover, existing ML approaches in cases of high uncertainty may not provide the ML framework with the option to say "This is my current estimate with uncertainty, but I need more data from (a relevant) source X to be more confident" or "I cannot reliably answer that question at this moment, but I can do X, Y or Z to get you a better answer." For example, a neural network-based classifier for fault detection (ML framework) using a pre-defined set of optimal features may output fault/no fault only, whereas a human expert looking at an inconclusive observation may ask/look for contextual information, prior experience and data from other sources too.

The term "physical asset" should be understood to include any sort of mechanically operational entity, asset including, but not limited to, jet engines, locomotives, gas turbines, and wind farms and their auxiliary systems as incorporated. The term is most usefully applied to large complex powered systems with many moving parts, numerous sensors and controls installed in the system. As used herein, the terms "installed product," "asset," "physical asset" and "powered system" may be used interchangeably.

As used herein, the term "automatically" may refer to, for example, actions that may be performed with little or no human interaction.

In one or more embodiments, a competence module may allow analytic ML models to generate an optimal decision for operation of the physical asset. The competence module may be used to detect ML model competence and may provide methods to trigger learning during operation of the asset. When the competence module determines the ML model is incompetent, the module may switch parameters to operate the asset, from parameters provided by the incompetent ML model to robust or baseline parameters. In one or more embodiments when the competence module is implemented on an edge device or edge-cloud device, this may allow for continuous learning-based control of a physical asset or system.

It is noted that several conventional approaches exist to understand online model performance (competence) when outputs are available possibly after some time delay. Those approaches are concept drift detection and concept drift-based model adaptation. However, in closed loop control problems, the output and input are tightly coupled and cannot be used to learn a model of causal relationships of input with output, as inputs actively try to regulate the outputs. In such scenarios, an open-loop study may be conducted by varying inputs with suitable design of experiments or active learning-based intelligent sampling and observing the corresponding outputs and building a model using this data at periodic intervals or by following a pre-defined model update schedule.

By providing, in one or more embodiments, a competence module that may monitor the competence of the model, the system may decide for itself if more data is needed and then move into a data collection phase with open loop experiments. It is also noted that in several cases the output may not be readily available and may be collected by running simulations or by transfer learning from other assets in a fleet of assets. One or more embodiments provide for a competence module that may ask for help from various learning sources, after assessing its own competence, which in turn may trigger ML model adaptation to improve competence over time.

As a non-exhaustive example, using data from wind and gas turbines, a machine learning model (e.g., Gaussian Process/neural network model) is built with ambient conditions, system variables, and control variables as input. Using a separate density estimation model over inputs, the probability of each input coming from the previously observed training data is tracked to detect anomalous or novel inputs. If there are novel or anomalous inputs persistently over a chosen time window in length, then the model is declared incompetent due to input drift. Moreover, the model may also become incompetent if the output uncertainty of the ML model is anomalous persistently. In this case, the uncertainty estimate provided from a Gaussian process model is used and a threshold which bounds the false alarm rate or a threshold, as provided from the domain, is given, beyond which it is defined that the model is incompetent due to output uncertainty anomaly. Instead of using the estimates provided by the incompetent model, a domain knowledge provided set-point (robust baseline) is used as the prescribed control set-point for the asset. In a simulated example, under persistent incompetence, the system may trigger active learning as a means for the model to learn on the asset with which it can improve competence over time.

One or more embodiments may provide a competence module that may include two model-agnostic mechanisms for competence monitoring. A first mechanism may relate to an input anomaly or novelty detection to identify input drift using density estimation and one-class classification techniques, such as parametric Gaussian mixture models, non-parametric nearest neighbor kernel density models, one-class support vector machines, etc. A second mechanism may relate to output uncertainty anomaly detection for models that provide uncertainty estimates or prediction intervals along output estimates.

In one or more embodiments, the competence module may determine whether the input is within a competent region of the ML model. When the input is in the competent region of the ML model, the competence module may use the ML model with an optimizer to choose the control inputs to operate the asset. When the input is not in the competent region of the ML model (e.g., is in the incompetent region), the competence module may, in embodiments after a number n of instances of input in the incompetent region out of a window of length N, trigger a learning mechanism to train the model with the update (e.g., the input included in the n instances). In one or more embodiments, due to potential discrepancy between true data distribution and approximation captured by input competence monitoring or due to high process variability in certain regions, as non-exhaustive examples, the input may appear to be competent for the model, but the output maybe unreliable. In order to add more reliability and avoid these scenarios, the competence module may also analyze uncertainty associated with an output of the model. When the output mechanism determines the output is not in the competent region, then under normal conditions it may be due to model extrapolation or high process variability in that region. The case of model extrapolation may be captured by input competence monitoring, so when output uncertainty is anomalous, the control input reverts to a predefined robust operation. If in contradiction with the input mechanism (saying input is competent), when the output mechanism determines the input is not in the competent region, the competence module may, in embodiments after a number n of instances of output in the incompetent region, decide to not trigger a learning mechanism as those inputs are already observed, implying high process variability leading to unreliable outputs.

Figure 1:
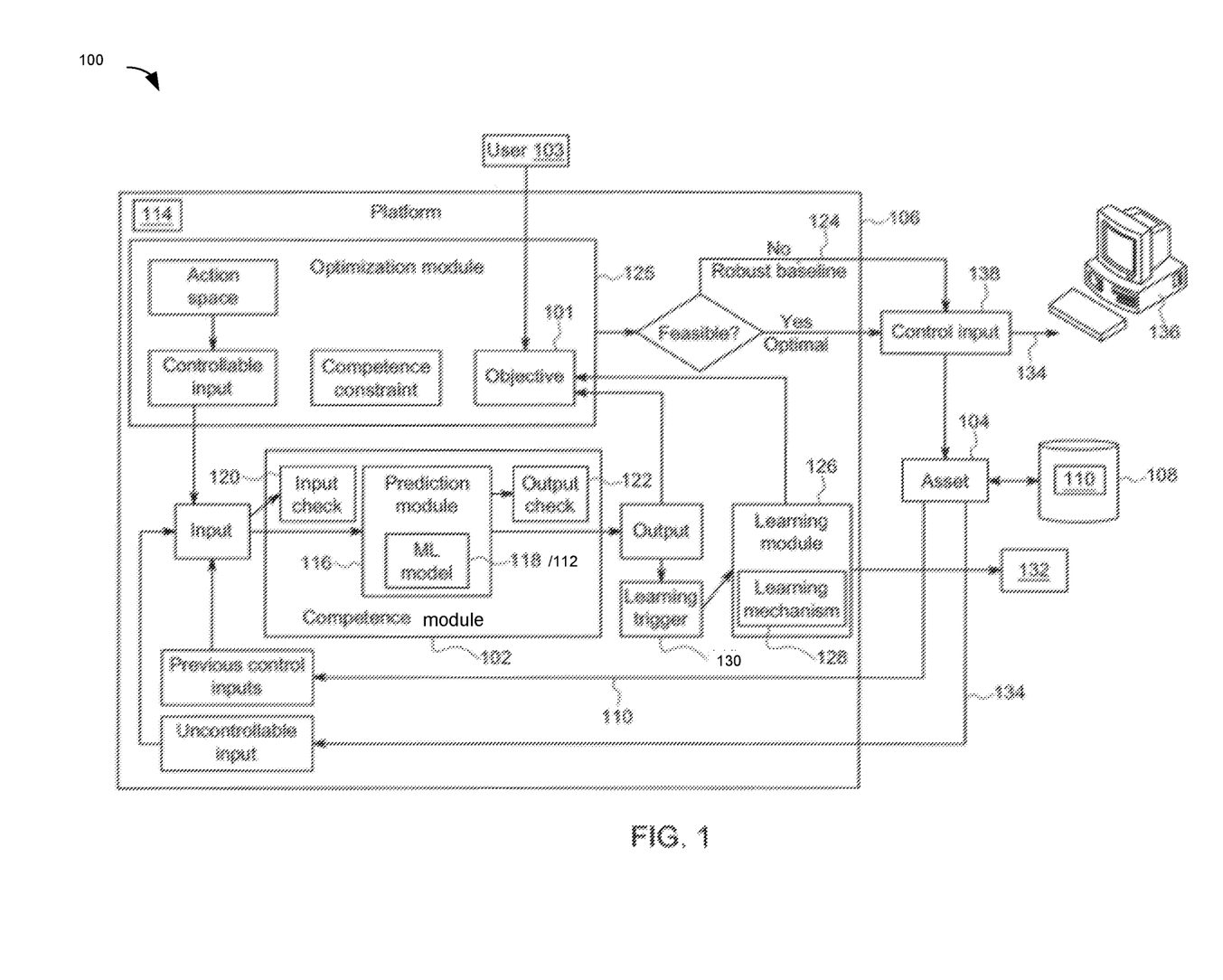
FIG. 1 illustrates a system according to some embodiments.

FIG. 1 is a block diagram of an example operating environment or system 100 in which a competence module 102 may be implemented, arranged in accordance with at least one embodiment described herein. FIG. 1 represents a logical architecture for describing processes according to some embodiments, and actual implementations may include more or different components arranged in other manners.

The system 100 may include at least one physical asset 104 ("asset"). It is noted that while one asset 104 is shown herein, other assets 104 may be included in the system. The physical asset 104 may communicate with a platform 106, and elements thereof, in a same manner, as described below. It is noted that the asset 104 may include a considerable (or even very large) number of physical elements or items. The asset 104 may include subsystems, such as sensing and localized control, in one or more embodiments.

In some embodiments, the system 100 may include a computer data store 108 that may provide data 110 to the competence module 102 and may store data from the asset 104, as well as historical data. In one or more embodiments, the computer data store 108 may also store results from the competence module 102. The platform 106 may include one or more processor 114.

The competence module 102 may include a prediction module 116 to obtain estimates using one or more ML models 118. As used herein, the ML model 118 may be any machine learning model, including but not limited to linear regression, non-linear regression, Gaussian process regression, neural networks, random forests, gradient boosted trees, Bayesian regression and Bayesian neural networks. In some embodiments, the ML model 118 may satisfy two properties: 1. Quantify uncertainty or prediction intervals in outcomes to allow better competence monitoring, and 2. Allow for sequential or batch update for continuous learning without complete retraining of the model for efficiency. In one or more embodiments, the ML model 118 may be a digital twin, which is relevant to the operation of the asset, as the ML model is used for prediction and optimization, as further described below. It is noted that apart from the ML model, digital twin may also consist of physics-based or first principles models to estimate unmeasurable system states, and may estimate system and/or subsystem features, that can help in optimization and control.

The competence module 102 may also include an input check 120 to check input anomaly/novelty before using the ML model 118, and an output check 122 to check output uncertainty anomaly after using the ML model 118. The competence module 102 may also include an optimizer module 125, a robust baseline 124 and a learning module 126. The learning module 126 may include one or more learning mechanisms 128 and a learning trigger 130.

The optimizer module 125 may use the output from the prediction module 116, the input check 120 and the output check 122 on various control inputs along with measurements of uncontrollable conditions or disturbance variables to identify optimal control inputs for which the ML model 118 is competent. In one or more embodiments the optimizer module 125 may conduct optimization over the different values (discrete set or continuous set) under the constraint for which the model should be competent for the potential different values. Competence checking may be used with the optimizer module 125 as a constraint, so that any scenario being evaluated for optimization in the optimizer module 125 that uses the ML model knows if the evaluation should be trusted or ignored, based on whether the model is competent or not. When only a subset of action space is available where the ML model 118 is competent, it may imply that under the values used as input to the ML model 118, the system has never seen outcomes for some of those actions before, and it cannot reliably predict the outcome for all actions. When the ML model 118 is incompetent over all input values, (i.e., the set of feasible actions is empty), then the system 100 may revert to a robust baseline 124 per the robust baseline trigger (not shown) instead of trying to optimize performance.

In one or more embodiments, the robust baseline 124 may be identified by subject matter experts or by developing models from first principles to provide safety and robustness guarantees. The objective of the robust baseline is not that of optimal control with respect to the outcome of interest, but of reverting back to a stable and safe region, where the ML-based model is not competent to extract optimal performance. A non-exhaustive example of robust baseline 124 may be to remove any biases added to a supervisory signal that give reference for a low-level controller to track.

The processor 114 may, for example, be a conventional microprocessor, and may operate to control the overall functioning of the competence module 102.

The competence module 102, according to some embodiments, may access the computer data store 108 and then utilize the ML model 118 to create a prediction and/or result that may be used by the competence module 102 to modify operation of the asset 104. For example, in one or more embodiments, the competence module 102 may simulate (e.g., via the ML model 118) a particular data point to optimize a particular objective. As a non-exhaustive example, the ML model 118 may include, e.g., a machine learning component to predict the future state of the system. In one or more embodiments, digital twin 112 may be used by the optimization module 125 to estimate unmeasurable system states, and may estimate system and/or subsystem features. The estimates may be used to generate suggestions for operation of the asset in a manner that better meets the objectives (e.g., optimizes a cost of the project, optimizes a delivery date, etc.).

As used herein, references to a "digital twin" should be understood to represent one example of a number of different types of modeling that may be performed in accordance with teachings of this disclosure.

The competence module 102, according to some embodiments, may receive data from the asset 104, as well as from the computer data store 108. The prediction module 116 obtains estimates using the ML model 118 for suitable structured input vectors which may consist of control inputs and observations of uncontrollable conditions or disturbance variables (e.g., ambient temperature or wind speed). In one or more embodiments, the input check 120 may check the input vectors for anomalies or novelty before they are input to the ML model 118. In one or more embodiments, the input check 120 may identify input drift using density estimation and one-class classification techniques, such as parametric Gaussian mixture models, non-parametric nearest neighbor kernel density models, one-class support vector machines, etc. As used herein, "input drift" may refer to ML model input coming from a probability distribution that is different from the data distribution used for training until now. In one or more embodiments, the density estimation models may use an acceptable false alarm rate (e.g., 1% or 0.1%), and then a threshold on negative log-likelihood scores may be selected via cross validation. The density models may then be used to compute the scores and compare the scores with the threshold at runtime to understand if each input (or scenario for optimization) to the ML model 118 is from a competent region or not.

The output check 122 may check output uncertainty for the output of the ML model 118. In one or more embodiments, the output check 122 may be applied in instances where the ML model 118 provides uncertainty or prediction intervals along with the output estimates. When uncertainty or prediction intervals are not provided, the competence module 102 may create conformal prediction intervals for any arbitrary ML model, which may then be used in this output check 122. In one or more embodiments, the statistics that denote output uncertainty may be used in a cross-validation step to understand the variation of this statistic over the training set. In one or more embodiments, using an acceptable false alarm rate, an uncertainty threshold may be chosen directly over this uncertainty statistic. The uncertainty statistic may be evaluated in runtime and compared with the chosen uncertainty threshold. In one or more embodiments, the uncertainty threshold may be obtained from domain knowledge or by quantifying impact of the uncertainty threshold on outcomes on the asset.

It is noted that the input check 120 and output check 122 may be applicable even when truth value of predicted output is not available from the system. If true value of predicted output from the system is also available at runtime (potentially with some delay), then residuals of error in estimated and true values may be computed to detect concept drift as well, which may be another complementary measure of model competence. It is further noted that in on or more embodiments, at least one of these competence monitoring approaches (e.g., input check, output check, residuals of error, etc.) or a fusion of more than one approach may be used in runtime.

In one or more embodiments, the ML model 118 knows, per the competence module 102, its own competence, and may "ask" for help from various learning sources, which in turn may trigger ML-model adaptation via learning to improve competence over time. When the ML-model 118 is incompetent and the system reverts to the robust baseline 124 too often, as defined by a software developer, system administrator or any other suitable party, the persistence of incompetence may activate the learning trigger 130. In one or more embodiments, there may be additional domain-based rules to activate the learning trigger 130 (e.g., contextual information, time of day, availability of data sources), or avoid learning under certain conditions, such as, but not limited to, not allowing learning when the load is unsteady, or the load is at the peak, or wind speeds are too high, etc. The learning module 126 may include learning mode decision rules to not only initiate learning, via the learning trigger 130, but also to choose the learning mechanism 128 that is suitable to the current context. In one or more embodiments, when there is more than one learning mechanism 128 that may be chosen, the choice may be based on either rule-based logic encoded by subject matter experts or by availability or by cost associated with that information or by any other suitable parameter. As a non-exhaustive example, performing a simulation experiment for learning from simulation will include Central Processing Unit (CPU) hours and electricity cost, and if doing an experiment directly on the asset for self-learning will lead to suboptimal performance over a period, then the minimum cost learning mechanism (learning from simulation versus self-learning) may be chosen.

Figure 2:
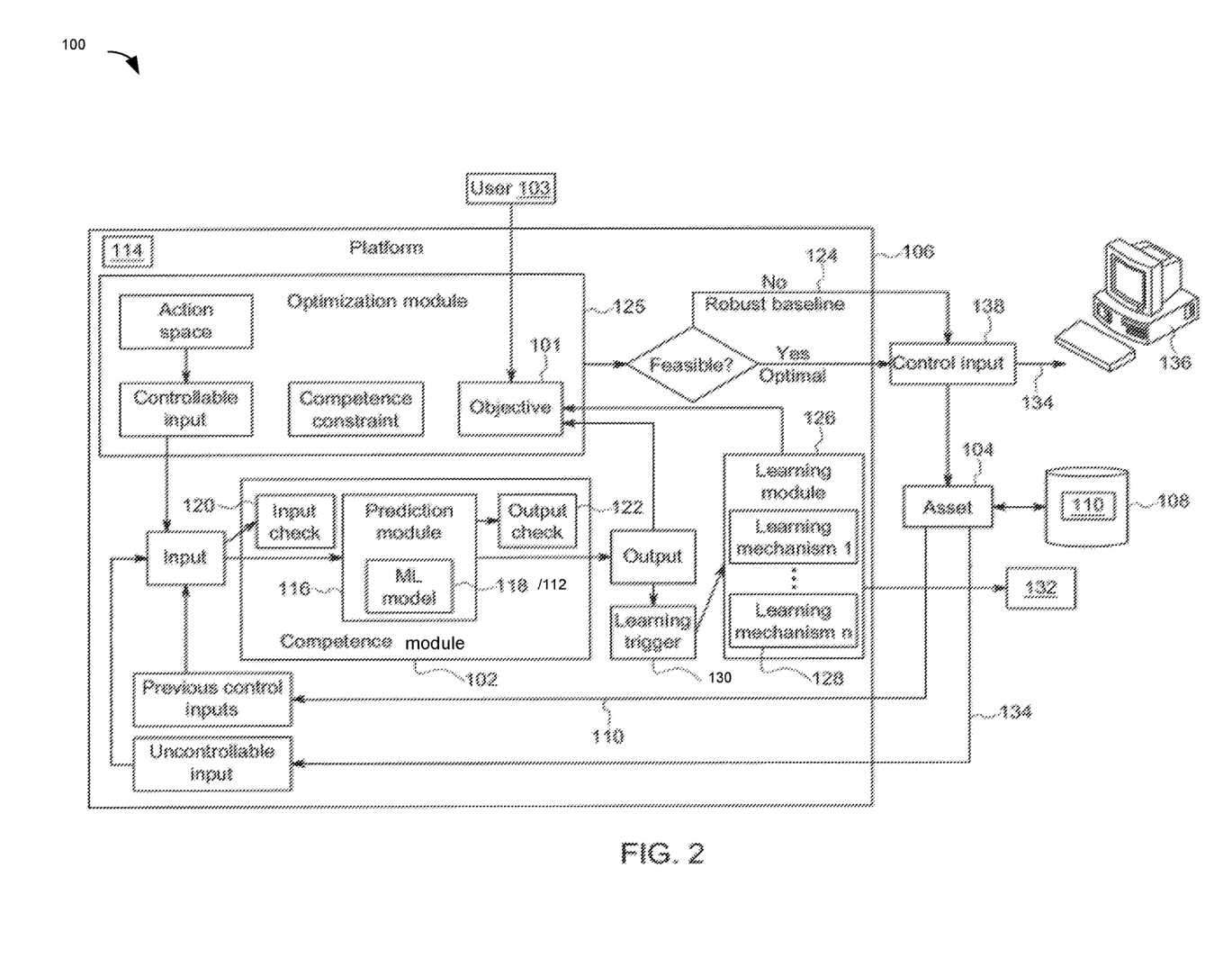
FIG. 2 illustrates a system according to some embodiments.

Some non-exhaustive examples of learning mechanisms 128 are self-learning by doing experiments on the asset, learning from others in a fleet of assets via transfer learning, learning from simulations of representative physical scenarios via simulation learning, or by learning from subject matter experts, which may help to understand novel scenarios. The multiple learning mechanisms 128 are shown in FIG. 2, for example. In one or more embodiments, each of these learning mechanisms has its own respective mechanism to collect the output for the incompetent input. For example, a simulation running on a cloud platform might accept a configuration file with inputs (where learning is needed) to launch the application and might record relevant outputs in suitable format, which can be parsed to obtain input-output data pair from simulation experiment. In one or more embodiments, the learning module 126 may establish or leverage a communication link to ask for output data by sending out relevant input to the chosen learning mechanism 128. After the input and expected output data is collected, the received data may be used in a model update module 132 to create an updated ML model. The ML model 118 may be updated in a sequential mode, batch mode, or by a complete retraining on relevant dataset. In one or more embodiments, the model update module 132 may run in a separate computing environment or service (e.g., a separate Docker Container®), so that the tasks of other modules (e.g., competence module 102) is unhindered by a potentially computationally-expensive model update step.

It is noted that certain types of ML models, such as Gaussian processes, grow in computational complexity with the number of data points, and in concept drift scenarios older data slowly becomes irrelevant. Thus, for managing time complexity, selectively forgetting (e.g., not using) irrelevant or least relevant data might be used. As such, in one or more embodiments, several model update mechanisms (e.g., sequential mode, batch mode, etc.) may be implemented with selective forgetting to manage time complexity, and then the model may be trained on relevant subset of data.

The competence module 102, according to some embodiments, may access the data store 108 or physical asset 104, one or more ML models and processing elements 114 to determine whether a particular input is in a competent region, and if not whether learning should be triggered to update the model.

The data store 108 may comprise any one or more systems that store data that may be used by the module. The data stored in data store 108 may be received from disparate hardware and software systems associated with the asset 104, or otherwise, some of which are not inter-operational with one another. The systems may comprise a back-end data environment employed in a business, industrial, or personal context. The data may be pushed to data store 108 and/or provided in response to queries received therefrom.

In one or more embodiments, the data store 108 may comprise any combination of one or more of a hard disk drive, RAM (random access memory), ROM (read only memory), flash memory, etc. The data store 108 may store software that programs the processor 114 and the competence module 102 to perform functionality as described herein.

The data store 108 may support multi-tenancy to separately support multiple unrelated clients by providing multiple logical database systems which are programmatically isolated from one another.

The data may be included in a relational database, a multi-dimensional database, an eXtendable Markup Language (XML) document, and/or any other structured data storage system. The physical tables of data store 108 may be distributed among several relational databases, multi-dimensional databases, and/or other data sources. The data of data store 108 may be indexed and/or selectively replicated in an index.

The data store 108 may implement as an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data comprises one or more of conventional tabular data, row-based data stored in row format, column-based data stored in columnar format, time series data in a time series data store, and object-based data. Data store 108 may store data used by applications. The data store may comprise any query-responsive data source or sources that are or become known, including but not limited to a structured-query language (SQL) relationship.

A communication channel 134 may be included in the system 100 to supply input from at least one of the asset 104 and the data store 108 to the competence module 102.

In some embodiments, the system 100 may also include a communication channel 134 to supply output (e.g., information of persistent incompetence) from the competence module 102 to at least one of: user platforms 136, or to other systems for logging and for initiating any root-cause analysis to explain persistent incompetence. In some embodiments, received output from the module 102 may cause modification in the state or condition of the asset 104, due to understood degradation, sensor failures, or ambient condition changes.

As used herein, devices, including those associated with the system 100 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

A user may access the system 100 via one of the user platforms 136 (a control system, a desktop computer, a laptop computer, a personal digital assistant, a tablet, a smartphone, etc.) to view information about and/or manage the asset 104 in accordance with any of the embodiments described herein.

Figure 3:
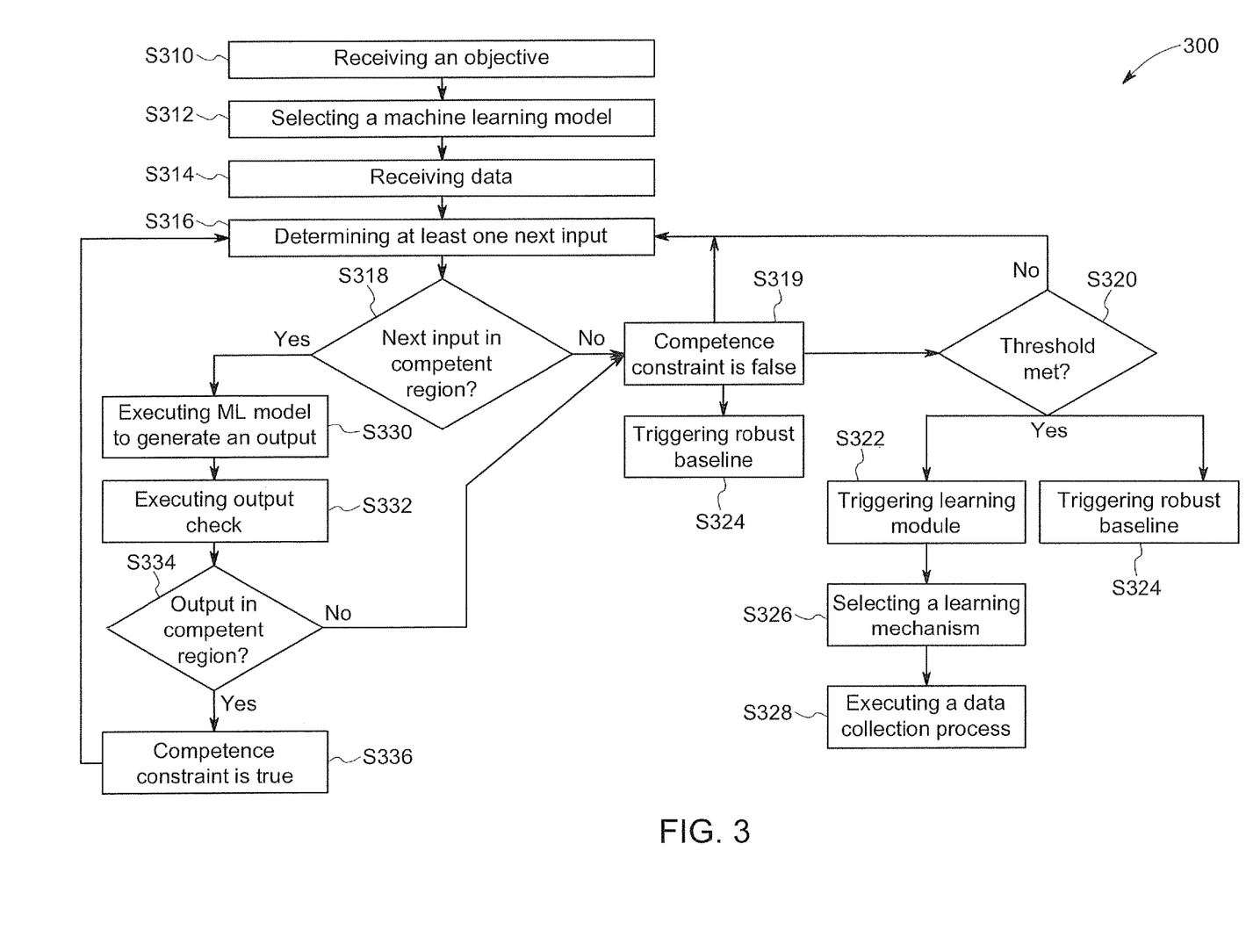
FIG. 3 illustrates a flow diagram according to some embodiments.
Figure 4A:
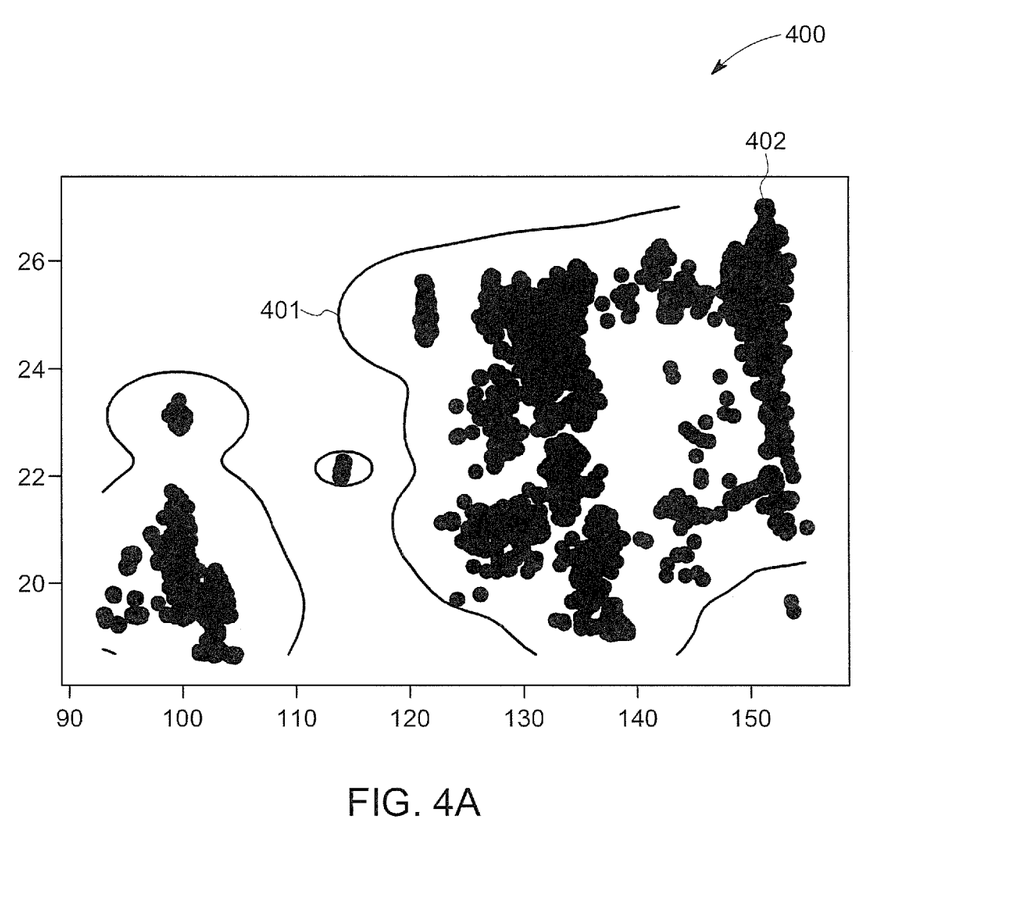
FIGS. 4A and 4B illustrate charts according to some embodiments.
Figure 4B:
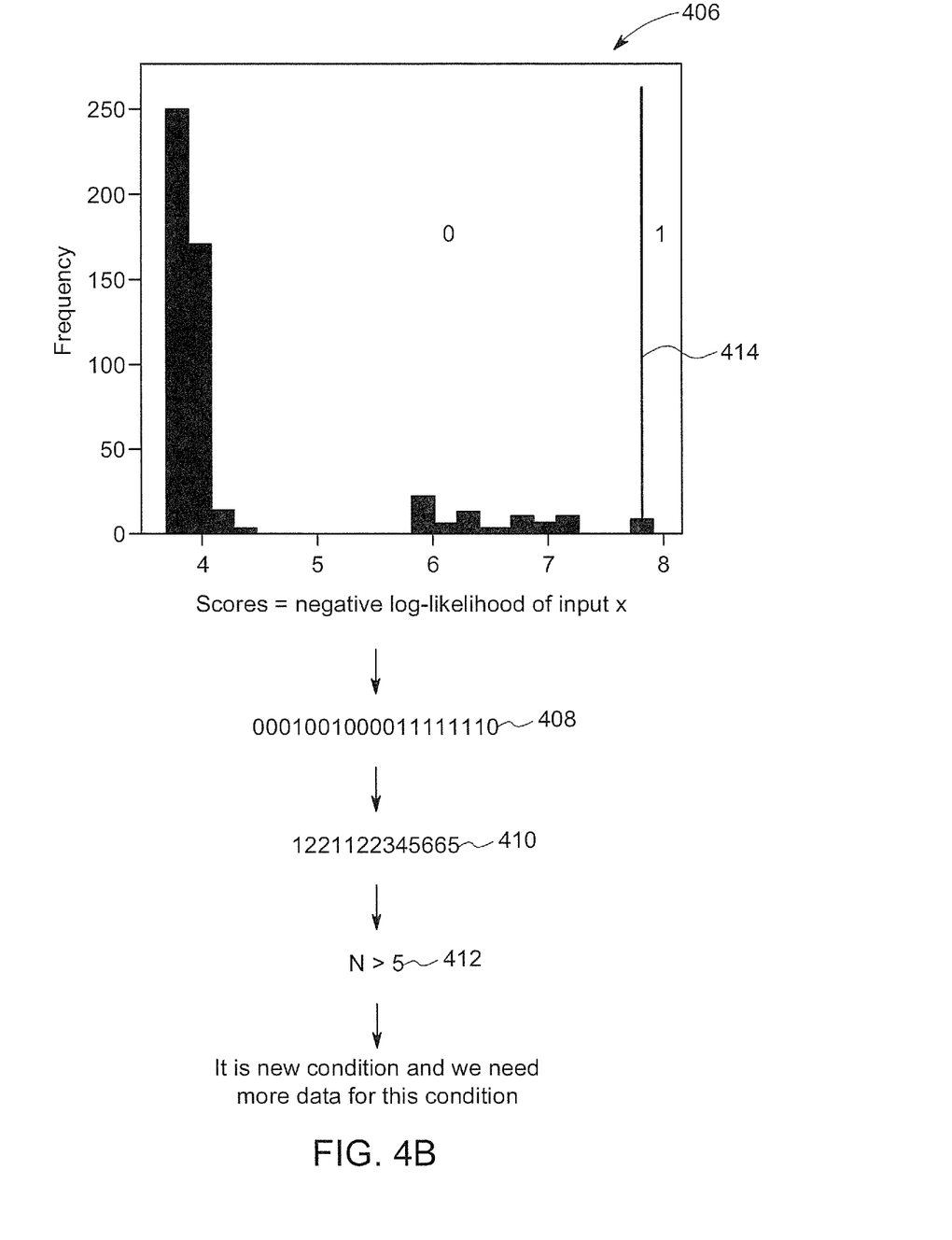

Turning to FIGS. 3-4, flow diagram 300 (FIG. 3) and associated diagrams, of an example of operation according to some embodiments is provided. In particular, FIG. 3 provides a flow diagram of a process 300, according to some embodiments. Process 300, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially at S310, an objective/business outcome 101 is received in the system 100 for optimization during asset operation, such as total cost, total power output, etc. The objective may be received from a user 103. The user may be an asset operator, developer, system administration, another program, or any other suitable party. Then in S312, a machine learning model 118 is selected with output that corresponds to the received objective 101, such that the model provides an output that the user cares about. In one or more embodiments, each objective 101 is associated with its respective ML model 118, or more than one objective 101 may be associated with one multi-output ML model 118. In one or more embodiments, the ML model has already been trained with data.

Data 110 may then be received at the competence module 102 from a data source in S314. The data source may be at least one of the asset 104, the data store 108, and domain knowledge (not shown). In one or more embodiments, the data from the asset may include previous control inputs and uncontrollable input, such as ambient conditions, described below. In one or more embodiments, the data 110 may include the measurement of uncontrollable conditions from the asset and also recorded current control inputs from the asset itself. For example, if the asset is a wind turbine, an uncontrollable condition may be ambient air temperature or the load/demand from a power plant. The uncontrollable ("ambient") condition may be a condition that cannot be directly controlled but may affect the ML model output and inputs. The uncontrollable and controlled data 110 may be obtained using any suitable data acquisition system. A data acquisition system may provide this data 110 to the system 100 to which it is connected.

In one or more embodiments, the data 110 may be continuously received as a result of a push or pull process, whereby the data is pushed from the data source to the competence module 102 based on some pre-defined condition, or the data is pulled from the data source by the competence module 102 based on a pre-defined condition (e.g., scheduled time, data buffer size, etc.). In one or more embodiments, the received data 110 is data that may be used by the ML model 118.

Then at S316, at least one next input for the ML model is determined based on the received data. The input to the ML model may consist of concatenation or suitable transformation of at least a few of the observed ambient/uncontrollable conditions, controllable conditions and previous control inputs. It is noted that the control input, which is not the next input, may be finally sent as output to the physical asset. It is then determined in S318 whether the determined next input is in a competent region of the training data. As used herein, "competent region" may be model-agnostic where input competence monitoring and output competence monitoring approaches identify an input to be competent (e.g., acceptable). It is noted that although output competence monitoring analyzes output uncertainty, via the model, it ends up also characterizing region of input space where the model is competent or not competent according to the decision rule.

In one or more embodiments, the input may be received by the input check 120 of the competence module 102. The input check 120 of the competence module 102 may estimate the likelihood that the new input will come from the training distribution (e.g., competent region). The competent region 401 may be shown for example in FIG. 4A. A non-exhaustive example of the input check 120 may be density estimation for anomaly/novelty detection or one-class classification techniques, such as parametric Gaussian mixture models, non-parametric nearest neighbor kernel density models, one-class support vector machines, etc. The input check 120 may be used to compute scores for the input and compare the score with a threshold at runtime to understand if the input (or scenario in optimization) is from the competent region.

FIGS. 4A-4B provide graphs describing a non-exhaustive example of the different steps of density estimation-based input incompetence monitoring. With density estimation, if an observation (e.g., input data) lies in a very low-density region, it is likely to be an anomaly or a novelty. In FIG. 4A, both the x and the y axis are ambient conditions in the graph 400. For example, the x-axis is power in Megawatts (e.g., the load/demand from a power plant) and the y-axis is the ambient air temperature, where the ML model is trained in the ambient space of FIG. 4A. The dots 402 in FIG. 4A represent the training data points. The graph 400 represents a distribution, where more dots are collected in the more well-known region.

FIG. 4B provides a graph 406 that represents a histogram of negative log likelihood scores using probability distribution on the training set. In the histogram, the scores are on the x-axis, and the y-axis indicates the frequency of those scores in the training data set. As shown herein, the lower the score, the better the ML model will understand that region of input. For example, if the input is 21 degrees and 130 MW, the model may be very competent to make a prediction with this input, as the model has seen a lot of data near this point. For input data points that move away from this area (e.g., 19.5 degrees and 120 KW), the model will be less competent. In this example, when the calculated score for the input is less than 7.9, the ML model may be competent to provide the output (as shown by vertical line 414 in FIG. 4B); and when the calculated score for the input is greater than 7.9, the input may represent an anomaly or new data that ML model has not been trained with. In one or more embodiments, a consecutive sequence of scores is converted to a binary sequence 408, and a window length is identified (e.g. window length of 6) for a cumulative sum of the binary sequence, which may be represented by a sequence 410. When a threshold number 412 of anomalies (e.g., N>5) occur within a given window, this may indicate an abnormally high number of anomalies over a predefined length of time implying a novel or anomalous condition, and the ML model may need to be trained with this data. In one or more embodiments, the threshold number 412 may be used to avoid false alarms, and to trigger data collection to re-train the ML model in response to a limited number of anomalies from same region. In one or more embodiments, the threshold number 412 may be set by a developer, system administrator or any other suitable user. In one or more embodiments, the histogram may include a threshold boundary 414 that is obtained by choosing a maximum acceptable false alarm rate (e.g., 1% or 0.1%), whereby the threshold 414 denotes that false alarm rate on data from training distribution will be less than or equal to the chosen false alarm rate.

Turning back to the process 300, when it is determined in S318 that the input is not in a competent region, the input is not used as an input to the ML model 118, and the competence constraint is false (unsatisfied) in S319. Then process proceeds to S320 to determine whether a threshold number has been met. It is noted that instead of proceeding to S320, the process may instead return to S316 and other feasible input may be determined by the optimization module. Turning back to S320, as described above, when less than a threshold number (e.g., the threshold number has not been met) of inputs are determined to be outside the competent region, these inputs may be categorized as anomalies, and the process 300 returns to S316 to determine at least one next input. It is noted that when in S320 the threshold number is not met, the input has been declared to be incompetent, so the ML model 118 is not correct to make predictions for that input. However, there may be other inputs in the competent region, thus "constrained on competence best input" is chosen for asset. If optimization is infeasible as all (relevant) inputs are incompetent, then the robust baseline 124 may be triggered irrespective of any threshold. If inputs are incompetent and optimization is infeasible for a few pre-specified number of times and threshold is met, trigger learning module as well as robust baseline may be triggered, in S322 and S324, respectively. When in S320, it is determined that at least the threshold number of inputs are outside the competent region, these control inputs may be categorized as novel data, and the process may proceed to S322, where the learning module 126 may be triggered, and S324 where a robust baseline 124 may be triggered. The process may use the robust baseline 124 to determine control input for the asset as the model is deemed incompetent. When the robust baseline 124 is triggered in S324, then a robust baseline control command maybe chosen for operation of the asset. It is noted that S322 and S324 may occur in any order, at the same time, substantially the same time, or different times.

When the learning module 126 is initiated in S322, via a learning trigger 130, a learning mechanism 128 is selected in S326. As described above, non-exhaustive examples of learning mechanisms are self-learning by doing experiments on the asset, learning from others in the fleet of assets (i.e. more than one asset) by transfer leaning, learning from simulations of representative physical scenarios via simulation learning, or learning form subject matter experts, which may help to understand novel scenarios. In one or more embodiments, the learning mechanism 128 may be selected dynamically by the learning module 126 based on decision rules. The decision rules may be encoded by, for example, subject matter experts, by availability or by cost associated with that information source (e.g., cost of collecting data). Then, in S328, a data collection process is executed per the selected learning mechanism, and a communication link (not shown) is either used or established to collect the data (e.g., for the learning mechanism to send input configuration files to a high-performance computing server to run a simulation to provide data for collection). The output data for relevant inputs produced by the executed data collection process is returned to create input-output pairs, and the input-output pairs are added to a database stored in the computer data store 108. In one or more embodiments, the collected data stored in the database may be used in a separate process (e.g., on a separate cloud environment) to update the ML model per the model update module 132, for example, and then the updated ML model replaces the original ML model. In one or more embodiments, the ML model may be updated in a sequential mode, batch mode, or completely retrained on the updated relevant dataset. In one or more embodiments, the data collection of S328 continues until a stopping criterion is met, including but not limited to: time duration; or till incompetence changes to competence of a sequentially updated model.

When it is determined in S318 that the input is in a competent region, the process may proceed to S330 and the ML model 118 may be executed with the input to generate an output. Then, in S332, the competence of the ML model 118 for that data input may be validated via execution of the output check 122. In one or more embodiments, the ML models 118 used may be those that provide some kind of uncertainty in their estimation. The uncertainty may be represented by prediction intervals, where the size of the interval (or a value of standard deviation/sigma) indicates the uncertainty. In one or more embodiments, the output check 122 may use the size of prediction intervals to detect unstable extrapolation for certain inputs. In one or more embodiments, the output check 122 may use a model competency decision rule. The rule indicates the model is competent if:

$$\hat{\sigma}(x) < \sigma_{critical}$$

Where $\hat{\sigma}(x)$ is the estimated: 1. Standard deviation from a Gaussian Process model or any other Bayesian model for an input x; 2. Size of prediction intervals from ensemble models for an input x; and 3. Size of conformal prediction intervals from any data-driven ML model for an input x (where "x" is the original input to the ML model).

It is noted that in a Neyman Pearson hypothesis testing-like framework, which may be used in one or more embodiments, $\sigma_{critical}$ is a pre-determined constant threshold, where it is chosen by application designer/developer or a user in the output check validation step to ensure that a misclassification rate of competent input as being incompetent (false alarm rate) is upper-bounded by $\sigma_{critical}$.

Then in S334 it is determined whether the input is in the competent region based on output uncertainty anomaly detection. In one or more embodiments, given the input, sigma(x) may be computed, which is the uncertainty associated with the predicted output, as the uncertainty output in GP or prediction intervals from other ML models. Then, the rule mentioned above is used to identify if the input is in the competent region. When it is determined in S334 that the output uncertainty is anomalous, the process 300 returns to S319, and the competence constraint is false (unsatisfied), and the process proceeds as described above. It is noted that, in one or more embodiments, when the output uncertainty is anomalous, then the process may proceed to a robust baseline operation irrespective of threshold. However, in one or more embodiments, a user may specify that whether learning is to be triggered or not may be allowed after a threshold as well.

When it is determined in S334 that the output is in the competent region, the process 300 may proceed to S336 and the value of constraint in the optimization module 125 is set to be True (satisfied), and the feasible optimal input from the optimization module 125 is chosen as control input for the asset. Execution of the optimization module 125 includes receiving the output from the output check 122 as well as the control input that led to the generation of the output. Then the process may return to S316 and the optimization module 125 may choose the next input for evaluation. As described earlier, competence monitoring may be used within optimization as a constraint. The output of the competence monitoring module 102 (i.e. input is in competent region or not) may be used as an evaluation of the competence constraint. If the input is incompetent, for example, then the constraint is false, else it is true, as described above. If feasible the set of feasible actions is non-empty, then the optimal feasible action may be chosen as the control input, else, if the feasible action set is empty, the robust baseline may be chosen as the control input. As such, output of the constrained optimization may be, in one or more embodiments, a control input, which may be either feasible optimal or robust baseline.

In one or more embodiments, the output from the optimization module 125 may be used as control input 138 to at least one of control the physical asset 104 (e.g., control what input is collected by the asset, control another action taken by the asset, control which feedback policy is used, operate another system, or as input to another system). With respect to the feedback policy, the feedback policy may be a control input selection rule which may use previous observations from the asset as "output feedback" to choose a next control input. In one or more embodiments, instead of switching between control inputs, the user may choose to switch between feedback policies. In one or more embodiments, in addition to controlling the physical asset, the output/control input 138 from the optimization module 125 may be transmitted to the asset 104, various user platforms 136 or to other systems (not shown), as appropriate (e.g., for display to, and manipulation by, a user).

Figure 5:
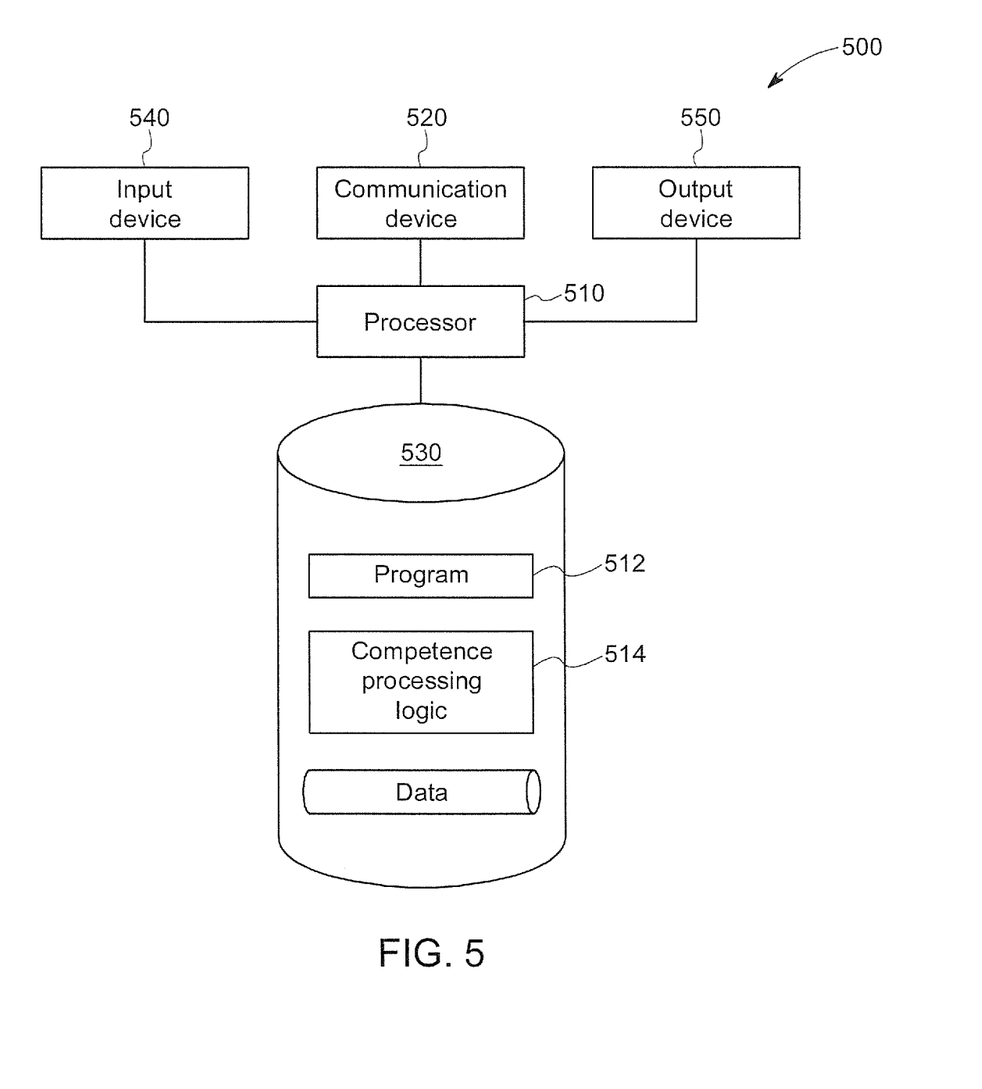
FIG. 5 illustrates a block diagram of a system according to some embodiments.

Note the embodiments described herein may be implemented using any number of different hardware configurations. For example, FIG. 5 illustrates a competence platform 500 that may be, for example, associated with the system 100 of FIG. 1. The competence platform 500 comprises a competence processor 510 ("processor"), such as one or more commercially available Central Processing Units (CPUs) in the form of one-chip microprocessors, coupled to a communication device 520 configured to communicate via a communication network (not shown in FIG. 5). The communication device 520 may be used to communicate, for example, with one or more users. The competence platform 500 further includes an input device 540 (e.g., a mouse and/or keyboard to enter information) and an output device 550 (e.g., to output the outcome of module execution).

The processor 510 also communicates with a memory/storage device 530. The storage device 530 may comprise any appropriate information storage device, including combinations of magnetic storage devices (e.g., a hard disk drive), optical storage devices, mobile telephones, and/or semiconductor memory devices. The storage device 530 may store a program 512 and/or competence processing logic 514 for controlling the processor 510. The processor 510 performs instructions of the programs 512, 514, and thereby operates in accordance with any of the embodiments described herein. For example, the processor 510 may receive data and then may apply the instructions of the programs 512, 514 to determine whether the input and/or output to/from the ML model is in a competent region.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the platform 500 from another device; or (ii) a software application or module within the platform 500 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 510 (FIG. 5). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A competence modelling and control system comprising:
   a competence module to receive data from at least one data source;
   a memory for storing program instructions;
   a competence processor, coupled to the memory, and in communication with the competence module, and operative to execute program instructions to:
   receive an objective;
   select a machine learning model associated with the objective;
   receive data from the at least one data source;
   generate at least one next input based on the received data, wherein the at least one next input is distinct from the received data;
   determine whether the at least one next input is in a competent region of training data of the machine learning model or is in an incompetent region of the machine learning model, wherein the competent region is a region in which the machine learning model is competent to make predictions;

when the at least one next input is inside the competent region, generate an output of the machine learning model;
determine an estimate of uncertainty for the generated output of the machine learning model;
when the uncertainty is below an uncertainty threshold, determine the machine learning model is competent and when the uncertainty is above the uncertainty threshold, determine the machine learning model is incompetent; and
operate the physical asset based on the state of the machine learning model, where the state is one of competent and incompetent.

2. The system of claim 1, further comprising program instructions to:
trigger at least one of a baseline control and a learning module when the at least one next input is in the incompetent region.

3. The system of claim 1, further comprising program instructions to:
determine a second next input of the at least one next inputs when it is determined the received at least one next input is in the incompetent region.

4. The system of claim 2, further comprising program instructions to:
determine whether a learning trigger of the learning module has been met, wherein the learning trigger is a pre-set threshold number of instances the input is in the incompetent region within a pre-set amount of time.

5. The system of claim 4, further comprising program instructions to:
initiate at least one learning mechanism of the learning module.

6. The system of claim 5, wherein the learning mechanism is one of a learning by experimenting on the physical asset, learning from second assets via transfer learning, learning by simulation, or learning from at least one expert.

7. The system of claim 5, wherein the system includes at least two learning mechanisms, and further comprises program instructions to:
select one of the at least two learning mechanisms based on a learning mode decision rule.

8. The system of claim 6, further comprising program instructions to:
collect second data based on the initiated learning mechanism.

9. The system of claim 8, further comprising program instructions to:
update the machine learning model based on the collected second data.

10. The system of claim 1, wherein the at least one data source is a physical asset.

11. A method comprising:
receiving an objective;
selecting a machine learning model associated with the objective;
receiving data from at least one data source;
generating at least one next input based on the received data, wherein the at least one next input is distinct from the received data;
determining whether the at least one next input is in a competent region of training data of the machine learning model or is in an incompetent region of the machine learning model, wherein the competent region is a region in which the machine learning model is competent to make predictions;
when the at least one next input is inside the competent region, generating an output of the machine learning model;
determining an estimate of uncertainty for the generated output of the machine learning model;
when the uncertainty is below an uncertainty threshold, determining the machine learning model is competent and when the uncertainty is above the uncertainty threshold, determining the machine learning model is incompetent; and
operating the physical asset based on the state of the machine learning model, where the state is one of competent and incompetent.

12. The method of claim 11, further comprising:
triggering at least one of a baseline control and a learning module when the at least one next input is in the incompetent region.

13. The method of claim 11, further comprising:
determining a second next input of the at least one next inputs when it is determined the at least one next input is in the incompetent region.

14. The method of claim 12, further comprising:
determining whether a learning trigger of the learning module has been met, wherein the learning trigger is a pre-set threshold number of instances the input is in the incompetent region within a pre-set amount of time.

15. The method of claim 14, further comprising:
initiating at least one learning mechanism of the learning module.

16. The method of claim 15, further comprising:
collecting second data based on the initiated learning mechanism.

17. The method of claim 16, further comprising:
updating the machine learning model based on the collected second data.

18. A non-transitory computer-readable medium storing instructions that, when executed by a computer processor, cause the computer processor to perform a method comprising:
receiving an objective;
selecting a machine learning model associated with the objective;
receiving data from at least one data source;
generating at least one next control input based on the received data, wherein the at least one next input is distinct from the received data;
determining whether the at least one next control input is in a competent region of training data of the machine learning model or an incompetent region of the machine learning model, wherein the competent region is a region in which the machine learning model is competent to make predictions;
when the at least one next input is inside the competent region, generating an output of the machine learning model;
determining an estimate uncertainty for the generated output of the machine learning model;
when the uncertainty is below an uncertainty threshold, determining the machine learning model is competent and when the uncertainty is above the uncertainty threshold, determining the machine learning model is incompetent; and
operating the physical asset based on the state of the machine learning model, where the state is one of competent and incompetent.

19. The medium of claim 18, further comprising instructions that cause the computer processor to:
trigger at least one of a baseline control and a learning module when the at least one next control input is in the incompetent region.

20. The medium of claim 18, further comprising instructions that cause the computer processor to:
determine a second next input of the at least one next inputs when it is determined at least one next input is in the incompetent region.

\* \* \* \* \*